US006984616B2

(12) United States Patent
Fedrigo et al.

(10) Patent No.: US 6,984,616 B2
(45) Date of Patent: Jan. 10, 2006

(54) WATER-BASED PURGE COMPOSITION

(75) Inventors: Nadine Fedrigo, Salem Township, MI (US); Michael E. Moore, Royal Oak, MI (US); Robert R. Patzelt, Bloomfield Hills, MI (US); Stephen Summerfield, Macomb, MI (US)

(73) Assignee: Gage Products Company, Ferndale, MI (US)

( * ) Notice: Subject to any disclaimer, the term of this patent is extended or adjusted under 35 U.S.C. 154(b) by 386 days.

(21) Appl. No.: 10/276,381

(22) PCT Filed: Apr. 24, 2002

(86) PCT No.: PCT/US02/12834

§ 371 (c)(1),
(2), (4) Date: Nov. 15, 2002

(87) PCT Pub. No.: WO02/085994

PCT Pub. Date: Oct. 31, 2002

(65) Prior Publication Data

US 2003/0153477 A1  Aug. 14, 2003

Related U.S. Application Data

(60) Provisional application No. 60/286,170, filed on Apr. 24, 2001.

(51) Int. Cl.
*C11D 7/50* (2006.01)
*C11D 3/20* (2006.01)
*C11D 3/26* (2006.01)

(52) U.S. Cl. ............... 510/407; 510/201; 510/202; 510/365; 510/499; 510/505; 510/506; 134/38; 134/40

(58) Field of Classification Search ............... 510/417, 510/365, 407, 201, 202, 499, 505, 506; 134/38, 134/40
See application file for complete search history.

(56) References Cited

U.S. PATENT DOCUMENTS

| 3,856,695 | A |   | 12/1974 | Geiss et al. .................. 252/162 |
| 3,972,839 | A |   | 8/1976  | Murphy ..................... 252/548 |
| 4,055,404 | A |   | 10/1977 | Daimer .......................... 55/85 |
| 4,525,291 | A |   | 6/1985  | Smith et al. .................. 252/95 |
| 4,592,787 | A | * | 6/1986  | Johnson ....................... 134/38 |
| 4,767,563 | A |   | 8/1988  | de Buzzaccarini ..... 252/174.25 |
| 4,769,170 | A |   | 9/1988  | Omori et al. ................ 252/107 |
| 4,913,825 | A |   | 4/1990  | Mitchell ..................... 210/705 |
| 4,956,115 | A |   | 9/1990  | Van De Mark ............. 252/170 |
| 4,973,420 | A |   | 11/1990 | Van De Mark ............. 252/170 |
| 5,298,184 | A |   | 3/1994  | Jarema ....................... 252/171 |
| 5,534,184 | A | * | 7/1996  | Underwood ................ 510/426 |
| 5,632,822 | A |   | 5/1997  | Knipe, Jr. et al. ........ 134/22.12 |
| 5,701,922 | A |   | 12/1997 | Knipe, Jr. et al. ........ 134/100.1 |
| 5,854,190 | A |   | 12/1998 | Knipe, Jr. et al. .......... 510/241 |
| 5,958,149 | A |   | 9/1999  | Callaghan et al. ............ 134/38 |
| 5,958,298 | A | * | 9/1999  | Nagoshi et al. .............. 252/392 |
| 5,972,865 | A |   | 10/1999 | Knipe, Jr. et al. .......... 510/212 |
| 6,048,924 | A |   | 4/2000  | Obayashi et al. ........... 524/501 |
| 6,071,334 | A |   | 6/2000  | Wider et al. ............. 106/31.58 |

FOREIGN PATENT DOCUMENTS

EP   0014597 A1   8/1980

\* cited by examiner

*Primary Examiner*—Gregory Webb
(74) *Attorney, Agent, or Firm*—Gifford, Krass, Groh, Sprinkle, Anderson & Citkowski, P.C.

(57) ABSTRACT

A purge solution for removing water-based dehydrated paint residues from a paint delivery system includes 2–15 total weight percent of a purge concentrate diluted with solvent. The concentrate includes 20–99.5 total weight percent of a $C_4$ alcohol or an alkoxylated $C_4$ alcohol, and 0.5–30 total weight percent of an amine.

27 Claims, No Drawings

WATER-BASED PURGE COMPOSITION

The application claims the benefit of Provisional application Ser. No. 60/286,170, filed Apr. 24, 2001.

FIELD OF THE INVENTION

This invention relates generally to compositions for cleaning paint delivery systems. More specifically, the invention relates to compositions for purging water-based paints and residues from paint delivery systems.

BACKGROUND OF THE INVENTION

High volume industrial painting of motor vehicles, appliances, furniture and other large items of manufacture is frequently carried out via fairly complex paint delivery systems. These systems include a number of paint delivery lines, spray heads and nozzles, tanks, pumps and the like. These paint delivery systems must be purged on a regular basis for purposes of maintenance, and when paint types or colors are changed. Purging includes the step of flushing the system with a purge solvent composition. This purge solvent should operate to remove paint residues and solvate dehydrated paint films. The purge solvent must be compatible with the paints which are employed in the system; and increasingly, industry is turning to water-based paints.

Hence, there is a need for purge solvents which are compatible with water-based paints and which can solubilize dehydrated films of the water-based paints, which films are generally water insoluble. Paint delivery systems frequently include components manufactured from reactive materials such as aluminum or the like; hence, purge compositions should be non-reactive towards system components. In addition, purge compositions should be low in volatile organic compounds (VOC) and should be low in toxicity and flammability. Also, purge compositions should be active at room temperature and preferably should be low in cost.

A number of purge compositions for water-based paints are known in the prior art. One purge composition which is presently employed includes glycol ethers such as propylene glycol normal propyl ether, butyl cellosolve, and the like together with dimethylethanolamine and water. This composition functions as a purge solvent for water-based paints; however, it must be used at elevated temperatures, which complicates its use and handling. Thus, there is a need for a purge solvent composition which is compatible with water-based paints and which can readily solubilize dehydrated residues of such water-based paints at room temperature.

SUMMARY OF THE INVENTION

A concentrate for preparing a water-based purge solvent includes 20–99.5 total weight percent of a $C_4$ alcohol or an alkylated $C_4$ alcohol and 0.5–30 total weight percent of an amine. A preferred purge solvent concentrate includes 60–80 total weight percent of n-butanol, 3–5 total weight percent of dimethylethanolamine, and 0.1–10 total weight percent of an ethoxylated fatty acid amine. The concentrate may also include up to 90% by weight of a co-solvent selected from the group consisting of surfactant, glycol ethers, acetone and polyethylene glycols. One preferred group of co-solvents comprises glycol ethers which are infinitely soluble in water, such as ethylene glycol monobutyl ether, or propylene glycol normal propyl ether. A purge solvent includes 2–15 total weight percent of an inventive purge solvent concentrate and 85–98 percent water. The purge solvent concentrate being as detailed above or consisting essentially of butanol or an alkoxylated $C_4$ alcohol. A method of cleaning a paint delivery system includes contacting a portion of the paint delivery system with a purge solvent including 2–15 total weight percent of a purge solvent concentrate dissolved in water.

DETAILED DESCRIPTION OF THE PREFERRED EMBODIMENTS

The present invention has utility as a waterborne dehydrated paint film remover. As used herein, "dehydrated paint film" is defined to mean a paint film that is deficient in a volatile component but has not been baked or otherwise cured. Through rapid penetration of paint films and non-reactivity towards aluminum relative to the prior art formulations, the present invention affords paint removal under a variety of conditions. A purge solvent composition includes water together with a concentrate which includes a $C_4$ alcohol and, in specifically preferred embodiments, an amine. Water typically makes up 85–98% of the purge solvent, with the remainder being the concentrate. Unless otherwise noted, all percentages given herein are on a weight basis. Typically, the concentrate comprises approximately 20% to 80% of the $C_4$ alcohol and approximately 0.5% to 30% of the amine; although, in some embodiments, the amine may be present in lower concentrations, or absent. In formulations where the concentrate is less than about 70% $C_4$ alcohol, a co-solvent replaces the $C_4$ alcohol or alkoxylated $C_4$ component. The co-solvent is a surfactant, a glycol or acetone having miscibility with water. A glycol operative herein includes ethylene glycol monobutyl ether (EB), propylene glycol n-propyl ether (PNP), and polyethylene glycol (PEG) having a molecular weight of less than 500 Daltons. Preferably, the glycol is EB. Where the glycol is PEG, preferably the PEG is present to less than 20%.

In accord with the present invention, it has been found that $C_4$ alcohols are preferred components of the purge solvent concentrate. In the context of this disclosure, $C_4$ alcohols are understood to include all of the butanols as well as alkoxylated butanols. $C_5$ alcohols are sparingly soluble in water, and not suitable for the present invention. $C_3$ alcohols such as isopropyl alcohol are not as effective as $C_4$ alcohols. It has been found that any $C_4$ alcohol may be utilized in the practice of the invention; however, n-butyl alcohol is most preferred because if factors of cost and availability. However, it is appreciated that other butanols and $C_1$–$C_{18}$ alkoxylated butanol are also operative herein.

In some embodiments of the invention, the $C_4$ alcohol will comprise the only active component of the concentrated. Where n-butanol is the only active ingredient, it is appreciated that the concentrate is diluted to less than about 7.9% in order to avoid a biphasic system with variations being apparent to one skilled in the art upon accounting for temperature and other solubility factors. In other embodiments, the concentrate will also include a low molecular weight amine of less than 300 Daltons. The amine component of the composition of the present invention may comprise an inorganic amine such as ammonium hydroxide; and organic amines are most preferred for the practice of the present invention. Preferably, the amine is an organic amine. More preferably, the organic amine is aprotic to prevent reaction with paint system components. Most preferably, the organic amine is a tertiary amine. Among some of the most preferred amines are N, N alkylated-cycloamines, -formamides, -amine acids, and -amides, N-alkylated lactams; and N-alkylated amines. Among alkanolamines, dimethylethanolamine (DMEA) is one particularly preferred amine. Other specific amines operative herein illustratively include N, N-dimethylforamide, morpholine, N-morpholine, N, N dimethylglycerine, diethanolamine, diethylmethyl amine and N, N diethylsuccinamic acid. It is further appreciated that mono-substituted, secondary amines and primary amines are also operative herein upon consideration of factors including corrosivity, butanol solubility, vapor pressure and flash point. N-methylethanoamine is exemplary of a secondary amine operative herein, whereas 2-amino-2-methyl propanol is exemplary of a primary amine operative herein. Other ethanolamines known to be useful in the practice of the present invention are mono-, di- and tri-ethanolamines as well as monomethylethanolamine. The low molecular weight amine is present from 0.5% to 30% of the concentrate. More preferably, the low molecular weight amine is present from 1% to 10%. Most preferably, the low molecular weight amine is present from 3% to 5%.

Fatty acid amines also have utility in the practice of the present invention, most preferably in combination with another amine such as DMEA. One particularly preferred group of fatty acid amines include alkoxylated fatty acid amines. As is known in the art, fatty acids are generally considered to be $C_4$–$C_{22}$ acids. Alkoxylated fatty acid amines are frequently used as emulsifiers, and one group of such materials which is commercially available comprises the Ethomeen® materials sold by the Akzo Nobel corporation. These materials have a formula $RN[(CH_2CH_2O)_mH(CH_2CH_2O)_nH]$ where R is cocoalkyl, oleyl, octadecyl, soyaalkyl or tallowalkyl; and n+m is an integer between 2 and 60. In general, this class of materials is referred to as ethoxylated cocoalkyl amines (CAS 61791-14-8). A similar group of materials are also available from Akzo Nobel under the designation Propomeen®, and they are also useful in this invention these generally have the formula $RN(CH_2CH(OH)CH_3)_2$ where R is oleyl or tallowalkyl. Typically, the fatty acid amine components are used in conjunction with a major amount of another, lower molecular weight, amine material such that the combined amine amount is 30% or below. Preferably, the fatty acid amine components are present from 0% to 15%; more preferably, from 0.5% to 3%; and most preferably from 1.2% to 2%.

The concentrate composition of the present invention also optionally includes aminoalcohols, and one particularly preferred group of amino alcohols includes $C_2$–$C_{20}$ aminoalkyl alcohols, most specifically 2-amino-2-methyl-1-propanol (AMP). Typically, an aminoalkyl alcohol is present in an inventive concentrate such that the combined amine amount is 30% or below. Preferably, the amino alcohol is present from 0 to 10%; more preferably, from 0.5 to 3%; and most preferably, from 1.2 to 2%.

The composition also optionally includes ancillary ingredients conventional to the art such as coloring agents, fragrances, rheology control agents such as fumed silica, surfactants, wetting agents and the like.

The preferred range of a complex purge concentrate component according to the present invention is as follows:

| Component | Wt. % |
|---|---|
| n-butanol | 20–80 |
| amines | 0.5–30 |
| low molecular weight amine | 0.5–30 |
| fatty acid amine | 0–15 |
| nitroalcohol or aminoalcohol | 0–10 |
| co-solvent* | 0–80 |

*co-solvent substitutes for n-butanol for total up to 99.5% of concentrate

An inventive purge concentrate, while operative in such a form to purge a paint delivery system, is typically diluted to 2 to 15 percent by volume with water. It is further appreciated that an inventive concentrate or diluted form thereof is readily recycled to remove solubilized paint therefrom and reused to again purge a paint delivery system. One preferred concentrate composition of the present invention comprises 60–80% n-butanol, 3–5% DMEA and 0.5–2% of an ethoxylated fatty acid amine. This concentrate composition can be blended with 85–98% of water to prepare a purge solvent. A specific composition within this general formulation includes 75% n-butanol, 3% DMEA and 1% of the alkoxylated fatty acid amine sold under the designation Ethomeen® 18/25 and 21% EB (Example 14).

The present invention is further illustrated by the following non-limiting Examples:

EXAMPLES 1–5

A series of inventive purge concentrates were formulated and compared with control formulations A, B, and C. Control formulations lack the butanol component. The control and inventive formulations would then be applied to a dehydrated film of Dupont water-based black automotive paint and the removal time measured according to standard test protocol RDL-WI-015 with all control and inventive formulations diluted to a 10% volume concentration in deionized water. RDL-WI-015 is a dry film test that involves a 4.2 mil- wet film of paint being cast onto a glass panel and allowed to flash at 120° F. for 30 minutes. A purge blend is diluted to 10% and spray applied at 5 psi onto the dry film. The penetration time of the dry film is recorded in seconds. A 3–5 second removal time is considered to be good to excellent results. This test is conducted in duplicate and the results averaged. The composition and penetration time for control formulations A–C and inventive formulations 1–5 are summarized in Table 1.

TABLE 1

| | Ctrl A | Ctrl B | Ctrl C | Ex. 1* | Ex. 2 | Ex. 3 | Ex. 4 | Ex. 5 | Ex. 6 |
|---|---|---|---|---|---|---|---|---|---|
| First Series of Testing | | | | | | | | | |
| Dimethyethanolamine (DMEA) | 1 | 18 | 18 | 0 | 18 | 18 | 18 | 18 | 25 |
| $C_{18}H_{37}N[(CH_2CH_2O)_mH(CH_2CH_2O)_mH]$ n + m = 15 (Ethomeen 18/25) | 0 | 7 | 7 | 0 | 7 | 7 | 7 | 7 | 0 |

TABLE 1-continued

| | First Series of Testing | | | | | | | | |
|---|---|---|---|---|---|---|---|---|---|
| | Ctrl A | Ctrl B | Ctrl C | Ex. 1* | Ex. 2 | Ex. 3 | Ex. 4 | Ex. 5 | Ex. 6 |
| ethylene glycol monobutylether (EB) | 99 | 75 | 37.5 | 0 | 37.5 | 37.5 | 18.25 | 0 | 0 |
| isopropanol (IPA) | 0 | 0 | 37.5 | 0 | 0 | 0 | 0 | 0 | 0 |
| n-butanol | 0 | 0 | 0 | 100 | 37.5 | 46.88 | 56.25 | 75 | 75 |
| Penetration Time (seconds) | 12.52 | 7.89 | 13.57 | 30+ | 6.94 | 7.63 | 5.63 | 4.84 | 4.84 |

*biphasic with excess n-butanol

EXAMPLES 7 AND 8

Inventive formulations, for Examples 7 and 8, are shown in Table 2 along with control A and the formulation of Example 5. Penetration time is determined for RDL-WI-015 with some statistical error noted based upon the penetration times for control A and Example 5, as repeated in duplicate. The formulations of Examples 7 and 8 vary from the previous inventive Examples as including amino-methyl-propanol and propoxylated amine, respectively.

TABLE 2

| | Ctrl A | Ex. 5 | Ex. 7 | Ex. 8 |
|---|---|---|---|---|
| DMEA | 1 | 18 | 18 | 12.5 |
| Ethomeen 18/25 | 0 | 7 | 0 | 0 |
| n-Tallowalkyl-1,1' aminobis-2 propanol $C_{16}$–$C_{18}$ (Propomeen T/12) | 0 | 0 | 0 | 12.5 |
| Amino-methyl-propanol (AMP) | 0 | 0 | 7 | 0 |
| EB | 99 | 0 | 0 | 0 |
| n-butanol | 0 | 75 | 75 | 75 |
| Penetration Time (seconds) | 8.38 | 7.46 | 6.39 | 8.38 |

EXAMPLES 9–14

Further inventive formulations of purge concentrate are formulated containing mixtures of aforementioned components with the penetration times and compositions as noted in Table 3.

TABLE 3

| | First Series of Testing | | | |
|---|---|---|---|---|
| | Ctrl A | Ex. 7 | Ex. 9 | Ex. 10 |
| DMEA | 1 | 18 | 18 | 18 |
| amino methyl propanol (AMP) | 0 | 7 | 7 | 0 |
| Propomeen T/12 | 0 | 7 | 0 | 7 |
| EB | 99 | 0 | 0 | 0 |
| n-butanol | 0 | 68 | 75 | 75 |
| Penetration Time (seconds) | 8.83 | 6.66 | 5.76 | 5.73 |

| | Second Series of Testing | | | |
|---|---|---|---|---|
| | Ex. 11 | Ex. 12 | Ex. 13 | Ex. 14 |
| DMEA | 18 | 18 | 18 | 3 |
| Ethomeen 18/25 | 0 | 7 | 7 | 1 |
| Proporneen T/12 | 7 | 0 | 7 | 0 |
| EB | 0 | 0 | 0 | 21 |
| n-butanol | 75 | 75 | 68 | 75 |
| Penetration Time (seconds) | 4.51 | 4.18 | 3.76 | 3.4 |

EXAMPLES 15–18

The purge concentrate according to Example 5 is duplicated with the substitution for n-butanol of isobutanol (Example 15), 2-butanol (Example 16), t-butanol (Example 17) and 3-methoxybutanol (Example 18). The concentrates are mixed as before and diluted to 10% by volume with deionized water. Penetration time of the diluted blends is evaluated at 70° F. and 120° F. as detailed above. The penetration time results in standard deviation for five trials at 70° C. is summarized in Table 4. For these tests, Dupont water-based automotive white WA 8554 is used as the test substrate.

TABLE 4

| Dupont White BC - Ambient Temp. | | |
|---|---|---|
| Example | Penetration Time (seconds) | Standard Deviation |
| 5 | 7.93± | 0.90 |
| 15 | 11.68± | 2.58 |
| 16 | 7.41± | 2.92 |
| 17 | 7.78± | 1.74 |
| 18 | 6.61± | 2.65 |

The same diluted purge concentrates were applied to the same substrate at 120° F. with approximately a 50% reduction in penetration time.

All of the above penetration time experiments were repeated with a change in substrate paint coating being Dupont water-based automotive red in one series, Dupont water-based automotive silver in another series. The results with red and silver were also duplicated at 120° F. These additional tests showed comparable results to those detailed herein above.

EXAMPLE 19

The penetration time of the aforementioned Control A is compared with inventive glycol-containing formulations. Penetration testing is conducted on Dupont White WA 8554, Dupont Medium Red WA 4086, and Dupont Dark Ming Blue WA 722J according to RDL-WI-015.

| Example 19 | Control A |
|---|---|
| 82% $H_2O$ | 99% EB |
| 10% PEG | 1% Amine |
| 5% Modified Alkylaryl Polyether | |
| 3% DMEA | |

-continued

| | Penetration Time (seconds) | |
|---|---|---|
| Paint | Example 19 | Control A |
| White, WA 8554 | 5.34 | 7.16 |
| Medium Red, WA 4086 | 7.03 | 7.92 |
| Dark Blue, WA 722J | 5.81 | 7.08 |

EXAMPLES 20 AND 21

The penetration time of the aforementioned Control A is compared with an aqueous DMEA concentrate (Example 20) and a butanol-cosolvent-rich-amine concentrate (Example 21). The penetration testing is conducted on PPG Inferno Red HWB P74857/4889261 AA, PPG Deep Cranberry HWB P52154/4889205 AA, and PPG Stone White HWB P83542/4889552 AA according to RDL-WI-015.

| Example 20 | Example 21 | Control A |
|---|---|---|
| 96% H$_2$O | 83% EB | 99% EB |
| 4% DMEA | 12% n-butanol | 1% DMEA |
| | 5% DMEA | |

| Paint | Example 20 | Example 21 | Control A |
|---|---|---|---|
| Inferno Red | 2.39 | 3.9 | 2.81 |
| Deep Cranberry | 4.96 | 3.44 | 4.91 |
| Stone White | 7.05 | 4.96 | 4.58 |

EXAMPLE 22

The penetration time of the aforementioned Control A is compared with an aqueous acetone concentrate. Penetration testing is conducted on Dupont White, Dupont Red, Dupont Blue according to RDL-WI-015.

| Example 22 | Control A |
|---|---|
| 96% H$_2$O | 99% EB |
| 4% Acetone | 1% DMEA |

| Paint | Example 22 | Control A |
|---|---|---|
| Red | 10.17 | 7.05 |
| White | 4.26 | 3.45 |
| Blue | 4.95 | 5.92 |

EXAMPLE 23

The penetration time of an EB concentrate relative to Control A is compared to previous detailed inventive formulations. Penetration testing is conducted on Dupont White GW7, Dupont Flame Red PR4, Dupont Bright Silver WS2 according to RDL-WI-015.

| Example 23 | Control A | Example 6 | Example 22 |
|---|---|---|---|
| 79% EB | 99% EB | 75% n-butanol | 96% H$_2$O |
| 20% H$_2$O | 1% DMEA | 25% DMEA | 4% DMEA |
| 1% DMEA | | | |

| Paint | Example 23 | Control A | Example 6 | Example 22 |
|---|---|---|---|---|
| White | 4.78 | 3.36 | 2.49 | 5.78 |
| Red | 2.51 | 2.06 | 1.40 | 2.72 |
| Blue | 14.51 | 10.16 | 6.89 | 12.37 |

EXAMPLE 24

The penetration time of the aforementioned Control A is compared with a butanol-rich-cosolvent-amine concentrate. Penetration performance is evaluated by applying 2.0 mils of wet basecoat with a drawdown bar on a clean glass panel. The panel is placed in a heated oven for 3 minutes at 120° F. The panel is then removed from the oven, flashed for an additional 3 minutes at ambient conditions. The panel is placed on a fixture at a 45° angle. From a burette with the tip positioned 1 inch above the glass panel, solvent is allowed to drop onto the panel at the same location for a total of 10, 25, 50 and 75 drops per panel. The solvent is tested at variable temperatures. Results are rated on a scale of 1–10, with 10 being the best, per GM Specification 9984304, section 3.3.4.4. This testing is conducted on BASF White Diamond Coat E54WW301. The test data is for 75 drops with a solution temperature of 120° F.

| Example 6 | Example 24 | Control A |
|---|---|---|
| 75% n-butanol | 35% EB | 99% EB |
| 25% DMEA | 62% n-butanol | 99% DMEA |
| | 3% DMEA | |

| No. of Drops | Example 7 | Example 8 | Control A |
|---|---|---|---|
| 75 | 10 | 10 | 9 |

In view of the foregoing, yet other modifications and variations of the present invention will be apparent to one of skill in the art. The foregoing Examples, discussion and description are illustrative of particular embodiments of the invention, but are not meant to be limitations upon the practice thereof. It is the following claims, including all equivalents, which define the scope of the invention.

What is claimed is:

1. A concentrate for preparing a water-based purge solvent, said concentrate comprising, on a total weight basis:
   20–99.5% of a $C_4$ alcohol or an alkoxylated $C_4$ alcohol; and
   0.5–30% of an amine;
   wherein said amine includes a fatty acid amine.
2. The purge solvent concentrate of claim 1, wherein said fatty acid amine is an alkoxylated fatty acid amine.
3. The purge solvent concentrate of claim 1, wherein said amine comprises a mixture of a low molecular weight amine and an alkoxylated fatty acid amine.
4. The purge solvent concentrate of claim 3, wherein said amine comprises a mixture of dimethylethanolamine and an ethoxylated fatty acid amine.
5. The purge solvent concentrate of claim 3, wherein said low molecular weight amine is present from 1–20 total weight percent and said fatty acid amine is present from 0.1–20 total weight percent.

6. The purge solvent concentrate of claim 1, wherein said $C_4$ alcohol comprises n-butanol.

7. The purge solvent concentrate of claim 1, wherein said alkoxylated $C_4$ alcohol is a methoxylated $C_4$ alcohol.

8. The purge solvent concentrate of claim 1 wherein said alkoxylated $C_4$ alcohol is 3-methoxybutanol.

9. The purge solvent concentrate of claim 1, wherein said amine is present from 3 to 5 total weight percent.

10. The purge solvent concentrate of claim 1, further including a co-solvent selected from the group consisting of a surfactant, a glycol ether, acetone, a polyethylene glycol, and combinations thereof.

11. The purge solvent concentrate of claim 10, wherein said co-solvent is present in an amount from 0.1 to 90 weight percent.

12. The purge solvent concentrate of claim 10, wherein said co-solvent is a glycol ether which is infinitely soluble in water.

13. A purge solvent concentrate comprising, on a total weight basis:
   20–99.5% n-butanol;
   0.5–30% dimethylethanolamine;
   0–10% of an ethoxylated fatty acid amine;
   5–10% aminomethylpropanol; and
   0.1–90% of a glycol ether which is infinitely soluble in water.

14. The purge solvent concentrate of claim 13, wherein said glycol ether is ethylene glycol monobutyl ether or propylene glycol monobutyl ether.

15. A concentrate for preparing a water-based purge solvent, said concentrate comprising on a total weight basis:
   20–99.5% of a $C_4$ alcohol or an alkoxylated $C_4$ alcohol;
   0.5–30% of an amine; and
   0.1–90% of a co-solvent selected from the group consisting of surfactants, glycol ethers, acetone, polyethylene glycols, and combinations thereof; and
   wherein said amine comprises a mixture of an alkanolamine and a fatty acid amine.

16. The purge solvent concentrate of claim 15, wherein said alkanolamine is dimethyl ethanolamine.

17. The purge solvent concentrate of claim 15, wherein said fatty acid amine is an alkoxylated fatty acid amine.

18. A method of cleaning a paint delivery system comprising contacting at least a portion of said system with the purge solvent comprising, on a total weight basis;
   2–15% of a purge solvent concentrate comprising on a total weight basis:
      20–99.5% of a $C_4$ alcohol or an alkoxylated $C_4$ alcohol:
      0.5–30% of an amine; and
      0.1–90% of a co-solvent selected from the group consisting of surfactants, glycol ethers, acetone, polyethylene glycols, and combinations thereof; and
   85–98% of a solvent.

19. A method of cleaning a paint delivery system comprising contacting at least a portion of said system with a purge solvent consisting of:
   2–15 total weight percent $C_4$ alcohol or $C_1$–$C_{18}$ alkoxylated $C_4$ alcohol dissolved in water.

20. The method of claim 18, wherein said amine is a $C_2$–$C_{20}$ aminoalkyl alcohol.

21. The method of claim 20, wherein said amine is selected from the group consisting of aminomethylpropanol, dimethylethanolamine, monoethanolamine, and combinations thereof.

22. The method of claim 20, further including a surfactant.

23. The method of claim 18, wherein said co-solvent comprises a glycol ether having infinite solubility in water; wherein said glycol ether is present from 15–40 weight percent.

24. The method of claim 23, wherein said glycol ether is ethylene glycol monobutyl ether or propylene glycol monobutyl ether.

25. The method of claim 18, wherein said $C_4$ alcohol is n-butanol.

26. The method of claim 18, wherein said solvent is water.

27. A method of cleaning a paint delivery system comprising contacting at least a portion of said system with the purge solvent comprising, on a total weight basis:
   2–15% of a purge solvent concentrate comprising on a total weight basis:
      20–99.5% of a $C_4$ alcohol or an alkoxylated $C_4$ alcohol; and
      0.5–30% of an amine;
   85–98% of water.

* * * * *